(12) United States Patent
He et al.

(10) Patent No.: US 11,903,540 B2
(45) Date of Patent: *Feb. 20, 2024

(54) CLEANING ROBOT AND METHOD OF SURMOUNTING OBSTACLE

(71) Applicants: BEIJING XIAOMI MOBILE SOFTWARE CO., LTD., Beijing (CN); BEIJING ROBOROCK TECHNOLOGY CO., LTD., Beijing (CN)

(72) Inventors: Yang He, Beijing (CN); Yongfeng Xia, Beijing (CN)

(73) Assignees: BEIJING XIAOMI MOBILE SOFTWARE CO., LTD., Beijing (CN); BEIJING ROBOROCK TECHNOLOGY CO., LTD., Beijing (CN)

( * ) Notice: Subject to any disclaimer, the term of this patent is extended or adjusted under 35 U.S.C. 154(b) by 292 days.

This patent is subject to a terminal disclaimer.

(21) Appl. No.: 17/361,154

(22) Filed: Jun. 28, 2021

(65) Prior Publication Data

US 2021/0321853 A1 Oct. 21, 2021

Related U.S. Application Data

(63) Continuation of application No. 16/211,229, filed on Dec. 5, 2018, now Pat. No. 11,076,737, which is a (Continued)

(30) Foreign Application Priority Data

Jun. 6, 2016 (CN) .......................... 201610394228.2

(51) Int. Cl.
*A47L 11/40* (2006.01)
*A47L 11/24* (2006.01)
(Continued)

(52) U.S. Cl.
CPC .......... *A47L 11/4061* (2013.01); *A46B 9/026* (2013.01); *A46B 13/001* (2013.01);
(Continued)

(58) Field of Classification Search
CPC ...... A47L 11/4061; A47L 11/24; A47L 11/28; A47L 11/282; A47L 11/4002;
(Continued)

(56) References Cited

U.S. PATENT DOCUMENTS

2016/0353959 A1* 12/2016 Lindhé ................. A47L 9/2826

* cited by examiner

*Primary Examiner* — Michael D Lang
(74) *Attorney, Agent, or Firm* — Syncoda LLC; Feng Ma

(57) ABSTRACT

A cleaning robot includes a detector configured to detect an obstacle; a determining circuit configured to determine whether the cleaning robot is in an obstacle obstruction state; and a controller configured to control the first drive wheel to cross an obstacle and control the second drive wheel to cross the obstacle according to a detection result when the cleaning robot is in the obstacle obstruction state, wherein the detector is further configured to detect whether the first drive wheel crosses the obstacle; and the controller is further configured to control the second drive wheel to cross the obstacle when the detector detects that the first drive wheel crosses the obstacle.

20 Claims, 6 Drawing Sheets

Related U.S. Application Data continuation of application No. PCT/CN2017/083112, filed on May 4, 2017.

(51) Int. Cl.
*G05D 1/02* (2020.01)
*A47L 11/28* (2006.01)
*A46B 9/02* (2006.01)
*A46B 13/00* (2006.01)
*A46B 13/02* (2006.01)
*A47L 11/282* (2006.01)
*G05D 1/00* (2006.01)

(52) U.S. Cl.
CPC .............. *A46B 13/02* (2013.01); *A47L 11/24* (2013.01); *A47L 11/28* (2013.01); *A47L 11/282* (2013.01); *A47L 11/4002* (2013.01); *A47L 11/4011* (2013.01); *A47L 11/4041* (2013.01); *A47L 11/4066* (2013.01); *A47L 11/4072* (2013.01); *G05D 1/02* (2013.01); *G05D 1/0214* (2013.01); *A46B 2200/302* (2013.01); *A47L 2201/04* (2013.01); *G05D 2201/0203* (2013.01)

(58) Field of Classification Search
CPC .............. A47L 11/4011; A47L 11/4041; A47L 11/4066; A47L 11/4072; A46B 9/026; A46B 13/001; A46B 13/02; G05D 1/02
See application file for complete search history.

CLEANING ROBOT AND METHOD OF SURMOUNTING OBSTACLE

CROSS-REFERENCE TO RELATED APPLICATIONS

This application is a continuation of, and claims priority to, U.S. patent application Ser. No. 16/211,229 filed on Dec. 5, 2018, which is a continuation of, and claims priority to International Appl. No. PCT/CN 2017/083112 filed on May 4, 2017, which claims priority to Chinese Patent Application No. 201610394228.2 filed on Jun. 6, 2016. The disclosures of these applications are hereby incorporated by reference in their entirely.

BACKGROUND

With the development of economy and technologies, cleaning robots (such as sweeping robots and mopping robots) are more and more widely used in daily life, and bring much convenience to users.

SUMMARY

The present disclosure relates to the field of automatic cleaning technologies, and more particularly, to a cleaning robot and a method for crossing an obstacle.

According to a first aspect of embodiments of the present disclosure, a cleaning robot is provided including a drive component, a detection component, an acquiring component and a controller. The drive component includes a first drive wheel and a second drive wheel arranged in parallel. The detection component is configured to detect whether the cleaning robot is in an obstacle obstruction state when the drive component drives the cleaning robot to travel. When the cleaning robot is in the obstacle obstruction state, the controller is configured to control the first drive wheel to cross an obstacle and control the second drive wheel to cross the obstacle according to a detection result acquired by the detection component and the acquiring component.

In some embodiments, when the controller controls the first drive wheel to cross the obstacle and controls the second drive wheel to cross the obstacle according to the detection result acquired by the detection component, the controller is configured to: control the first drive wheel to cross the obstacle, and control the second drive wheel to cross the obstacle when the detection result acquired by the detection component and the calculating component indicates that the cleaning robot is in the obstacle obstruction state and the inclined angle of the cleaning robot is less than a first angle.

In some embodiments, when the controller controls the first drive wheel to cross the obstacle, the controller is configured to: control the first drive wheel to travel in a first traveling direction, and control the second drive wheel to travel in a second traveling direction; or control the first drive wheel to travel in the first traveling direction at a first speed, and control the second drive wheel to travel in the first traveling direction at a second speed, the first speed being greater than the second speed; or control the first drive wheel to travel in the first traveling direction, and control the second drive wheel to remain stationary. The first traveling direction is a traveling direction of the cleaning robot before the cleaning robot enters the obstacle obstruction state, and the second traveling direction is opposite to the first traveling direction.

In some embodiments, when the controller controls the second drive wheel to remain stationary, the controller is configured to: control a drive direction of the second drive wheel to be the first traveling direction and a rotation speed of the second drive wheel to be zero.

In some embodiments, the detection component is configured to detect whether the second drive wheel rotates to the second traveling direction after the controller controls the rotation speed of the second drive wheel to be zero, and the controller is configured to control the second drive wheel to output a rotation force along the first traveling direction to remain stationary when the second drive wheel rotates to the second traveling direction.

In some embodiments, when the controller controls the second drive wheel to cross the obstacle, the controller is configured to: control the second drive wheel to travel in a first traveling direction, and control the first drive wheel to travel in a second traveling direction; or control the second drive wheel to travel in the first traveling direction at a first speed, and control the first drive wheel to travel in the first traveling direction at a second speed, the first speed being greater than the second speed; or control the second drive wheel to travel in the first traveling direction, and control the first drive wheel to remain stationary. The first traveling direction is a traveling direction of the cleaning robot before the cleaning robot enters the obstacle obstruction state, and the second traveling direction is opposite to the first traveling direction.

In some embodiments, when the controller controls the first drive wheel to remain stationary, the controller is configured to: control a drive direction of the first drive wheel to be the first traveling direction and a rotation speed of the first drive wheel to be zero.

In some embodiments, after the controller controls the rotation speed of the first drive wheel to be zero, the detection component is configured to detect whether the first drive wheel rotates to the second traveling direction, and when the first drive wheel rotates to the second traveling direction, the controller is configured to control the first drive wheel to output a rotation force along the first traveling direction to remain stationary.

In some embodiments, when the detection result acquired by the detection component and the calculating component indicates that the inclined angle of the cleaning robot is greater than a first angle, the controller is configured to control the cleaning robot to travel in a second traveling direction. The second traveling direction is opposite to a first traveling direction, and the first traveling direction is the traveling direction of the cleaning robot before the cleaning robot enters the obstacle obstruction state.

In some embodiments, when the detection result acquired by the detection component and the calculating component indicates that the cleaning robot is in the obstacle obstruction state and the inclined angle of the cleaning robot is less than a second angle, the controller is configured to control the cleaning robot to travel in a second traveling direction. The second traveling direction is opposite to a first traveling direction, the first traveling direction is the traveling direction of the cleaning robot before the cleaning robot enters the obstacle obstruction state, and the second angle is less than the first angle.

In some embodiments, the detection component is configured to detect whether the first drive wheel crosses the obstacle. When the detection component detects that the first drive wheel does not cross the obstacle, a number of occurrences of not crossing the obstacle is recorded; and when the number of occurrences is greater than a preset value, the controller is configured to control the cleaning robot to travel in a second traveling direction. A first traveling direction is a traveling direction of the cleaning robot before the cleaning robot enters the obstacle obstruction state.

In some embodiments, the detection component is configured to detect whether the first drive wheel crosses the obstacle; and the controller is configured to control the second drive wheel to cross the obstacle when the detection component detects that the first drive wheel crosses the obstacle.

In some embodiments, in a situation that the cleaning robot is in the obstacle obstruction state, when the controller controls the first drive wheel to cross the obstacle and controls the s wheel close to the obstruction obstacle, and the second drive wheel is a drive wheel away from the obstruction obstacle.

In some embodiments, when the detection component detects whether the cleaning robot is in the obstacle obstruction state, the detection component is configured to: detect whether the drive wheel is in a slipping state, the slipping state being a state in which the drive wheel rotates on a contact surface in a sliding manner; and determine that the cleaning robot is in the obstacle obstruction state when the drive wheel is in the slipping state.

In some embodiments, when the detection component detects whether the cleaning robot is in the obstacle obstruction state, the detection component is configured to: detect whether the drive wheel is in a stuck state, the stuck state being a state in which the drive wheel is stopped by an external force during rotation; and determine that the cleaning robot is in the obstacle obstruction state when the drive wheel is in the stuck state.

In some embodiments, when the detection component detects whether the cleaning robot is in the obstacle obstruction state, the detection component is configured to: acquire a traveling mileage of the drive wheel and a position of the cleaning robot; and determine that the cleaning robot is in the obstacle obstruction state when a variation value of the traveling mileage is beyond a preset range and the position of the cleaning robot does not change.

In some embodiments, when the detection component detects whether the cleaning robot is in the obstacle obstruction state, the detection component is configured to: detect whether a drive current of the drive component is greater than a preset current value; and determine that the cleaning robot is in the obstacle obstruction state when the drive current is greater than the preset current value.

In some embodiments, when the detection component detects whether the cleaning robot is in the obstacle obstruction state, the detection component is configured to: detect whether the cleaning robot is inclined; and determine that the cleaning robot is in the obstacle obstruction state when the cleaning robot is inclined.

According to a second aspect of embodiments of the present disclosure, a method for crossing an obstacle is provided. The method is applicable to a cleaning robot including a first drive wheel and a second drive wheel arranged in parallel and a controller. The method includes detecting whether the cleaning robot is in an obstacle obstruction state when the cleaning robot travels, and controlling the first drive wheel to cross an obstacle, and controlling the second drive wheel to cross the obstacle according to a detection result when the cleaning robot is in the obstacle obstruction state.

In some embodiments, controlling the first drive wheel to cross the obstacle, and controlling the second drive wheel to cross the obstacle according to the detection result includes: controlling the first drive wheel to cross the obstacle, and controlling the second drive wheel to cross the obstacle when the detection result indicates that the cleaning robot is in the obstacle obstruction state and an inclined angle of the cleaning robot is less than a first angle.

In some embodiments, controlling the first drive wheel to cross the obstacle includes: controlling the first drive wheel to travel in a first traveling direction, and controlling the second drive wheel to travel in a second traveling direction; or controlling the first drive wheel to travel in the first traveling direction at a first speed, and controlling the second drive wheel to travel in the first traveling direction at a second speed, the first speed being greater than the second speed; or controlling the first drive wheel to travel in the first traveling direction, and controlling the second drive wheel to remain stationary. The first traveling direction is a traveling direction of the cleaning robot before the cleaning robot enters the obstacle obstruction state, and the second traveling direction is opposite to the first traveling direction.

In some embodiments, controlling the second drive wheel to remain stationary includes: controlling a drive direction of the second drive wheel to be the first traveling direction and a rotation speed of the second drive wheel to be zero.

In some embodiments, the method further includes: detecting whether the second drive wheel rotates to the second traveling direction after controlling the rotation speed of the second drive wheel to be zero, and controlling the second drive wheel to output a rotation force along the first traveling direction to remain stationary when the second drive wheel rotates to the second traveling direction.

In some embodiments, controlling the second drive wheel to cross the obstacle includes: controlling the second drive wheel to travel in a first traveling direction, and controlling the first drive wheel to travel in a second traveling direction; or controlling the second drive wheel to travel in the first traveling direction at a first speed, and controlling the first drive wheel to travel in the first traveling direction at a second speed, the first speed being greater than the second speed; or controlling the second drive wheel to travel in the first traveling direction, and controlling the first drive wheel to remain stationary. The first traveling direction is a traveling direction of the cleaning robot before the cleaning robot enters the obstacle obstruction state, and the second traveling direction is opposite to the first traveling direction.

In some embodiments, controlling the first drive wheel to remain stationary includes: controlling a drive direction of the first drive wheel to be the first traveling direction and a rotation speed of the first drive wheel to be zero.

In some embodiments, the method further includes: detecting whether the first drive wheel rotates to the second traveling direction after controlling the rotation speed of the first drive wheel to be zero, and controlling the first drive wheel to output a rotation force along the first traveling direction to remain stationary when the first drive wheel rotates to the second traveling direction.

In some embodiments, the method further includes: controlling the cleaning robot to travel in a second traveling direction when the detection result indicates that an inclined angle of the cleaning robot is greater than a first angle. The second traveling direction is opposite to a first traveling direction, and the first traveling direction is the traveling direction of the cleaning robot before the cleaning robot enters the obstacle obstruction state.

In some embodiments, the method further includes: controlling the cleaning robot to travel in a second traveling direction when the detection result indicates that the cleaning robot is in the obstacle obstruction state and an inclined angle of the cleaning robot is less than a second angle. The second traveling direction is opposite to a first traveling direction, the first traveling direction is the traveling direction of the cleaning robot before the cleaning robot enters the obstacle obstruction state, and the second angle is less than the first angle.

In some embodiments, the method further includes: detecting whether the first drive wheel crosses the obstacle; recording a number of occurrences of not crossing the obstacle when the first drive wheel does not cross the obstacle; and controlling the cleaning robot to travel in a second traveling direction when the number of occurrences is greater than a preset value; in which a first traveling direction is a traveling direction of the cleaning robot before the cleaning robot enters the obstacle obstruction state.

In some embodiments, the method further includes: detecting whether the first drive wheel crosses the obstacle; and controlling the second drive wheel to cross the obstacle when the first drive wheel crosses the obstacle.

In some embodiments, controlling the first drive wheel to cross the obstacle, and controlling the second drive wheel to cross the obstacle according to the detection result when the cleaning robot is in the obstacle obstruction state includes: controlling the first drive wheel to cross the obstacle, and controlling the second drive wheel to cross the obstacle when the cleaning robot is in the obstacle obstruction state and there is an obstruction obstacle in a direction parallel to the traveling direction of the cleaning robot and perpendicular to a contact surface. The first drive wheel is a drive wheel close to the obstruction obstacle, and the second drive wheel is a drive wheel away from the obstruction obstacle.

In some embodiments, detecting whether the cleaning robot is in the obstacle obstruction state includes: detecting whether the drive wheel is in a slipping state, the slipping state being a state in which the drive wheel rotates on a contact surface in a sliding manner; and determining that the cleaning robot is in the obstacle obstruction state when the drive wheel is in the slipping state.

In some embodiments, detecting whether the cleaning robot is in the obstacle obstruction state includes: detecting whether the drive wheel is in a stuck state, the stuck state being a state in which the drive wheel is stopped by an external force during rotation; and determining that the cleaning robot is in the obstacle obstruction state when the drive wheel is in the stuck state.

In some embodiments, detecting whether the cleaning robot is in the obstacle obstruction state includes: acquiring a traveling mileage of the drive wheel and a position of the cleaning robot; and determining that the cleaning robot is in the obstacle obstruction state when a variation value of the traveling mileage is beyond a preset range and the position of the cleaning robot does not change.

In some embodiments, detecting whether the cleaning robot is in the obstacle obstruction state includes: detecting whether a drive current of the drive component is greater than a preset current value; and determining that the cleaning robot is in the obstacle obstruction state when the drive current is greater than the preset current value.

In some embodiments, detecting whether the cleaning robot is in the obstacle obstruction state includes: detecting whether the cleaning robot is inclined; and determining that the cleaning robot is in the obstacle obstruction state when the cleaning robot is inclined.

According to a third aspect of embodiments of the present disclosure, there is provided a non-transitory computer readable storage medium having instructions stored thereon. When the instructions are executed by a processor, a method for crossing an obstacle is performed, the method includes: detecting whether the cleaning robot is in an obstacle obstruction state when the cleaning robot travels; and controlling the first drive wheel to cross an obstacle, and controlling the second drive wheel to cross the obstacle according to a detection result when the cleaning robot is in the obstacle obstruction state.

It is to be understood that, both the foregoing general description and the following detailed description describe only some embodiments by way of example, and are not restrictive of the present disclosure.

BRIEF DESCRIPTION OF THE DRAWINGS

In order to clearly illustrate the various embodiments provided in the present disclosure, the following are drawings that accompany the description of the embodiments.

It is noted that these drawings should be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments should be interpreted to be contained within the scope of the disclosure.

DETAILED DESCRIPTION

Various embodiments of the present disclosure are described below with specific examples, and other advantages and effects of the present disclosure can be easily understood by those skilled in the field of technology from the contents disclosed in this specification.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The inventors of the present disclosure have recognized there may be various obstacles in the working environment of the cleaning robot, such as door sills between adjacent rooms, door stoppers, wires and stools on the ground, and the cleaning robot is easily obstructed by these obstacles during the work process, such that cleaning tasks cannot be continued.

In order to solve the problems that the cleaning robot cannot complete cleaning tasks due to obstacles in the traveling process, embodiments of the present disclosure provide a cleaning robot and a method for moving over or crossing an obstacle.

Figure 1:
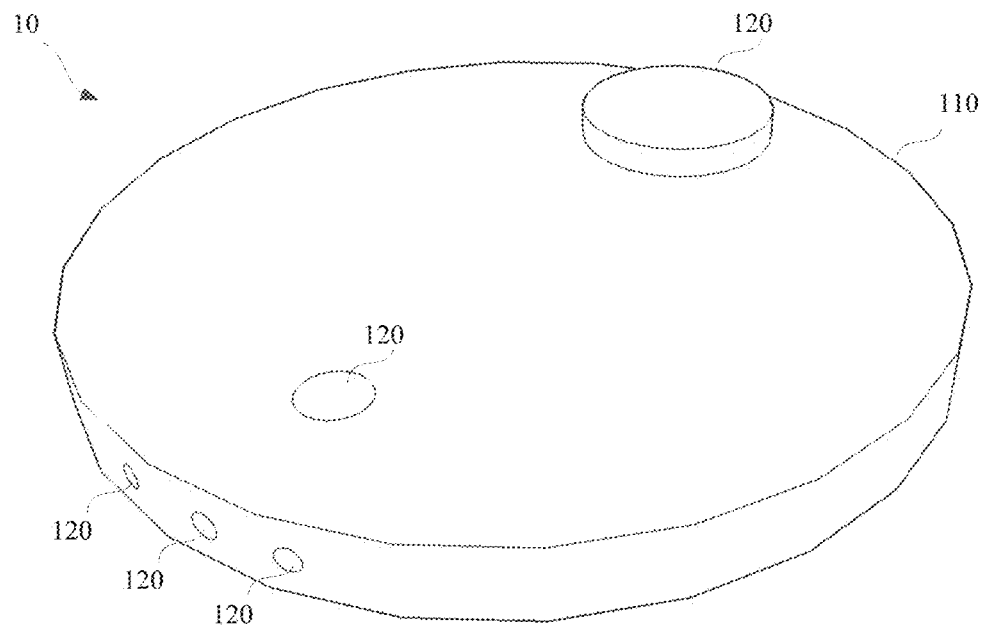
FIG. 1 is a schematic diagram of a cleaning robot according to some embodiments of the present disclosure.
Figure 2:
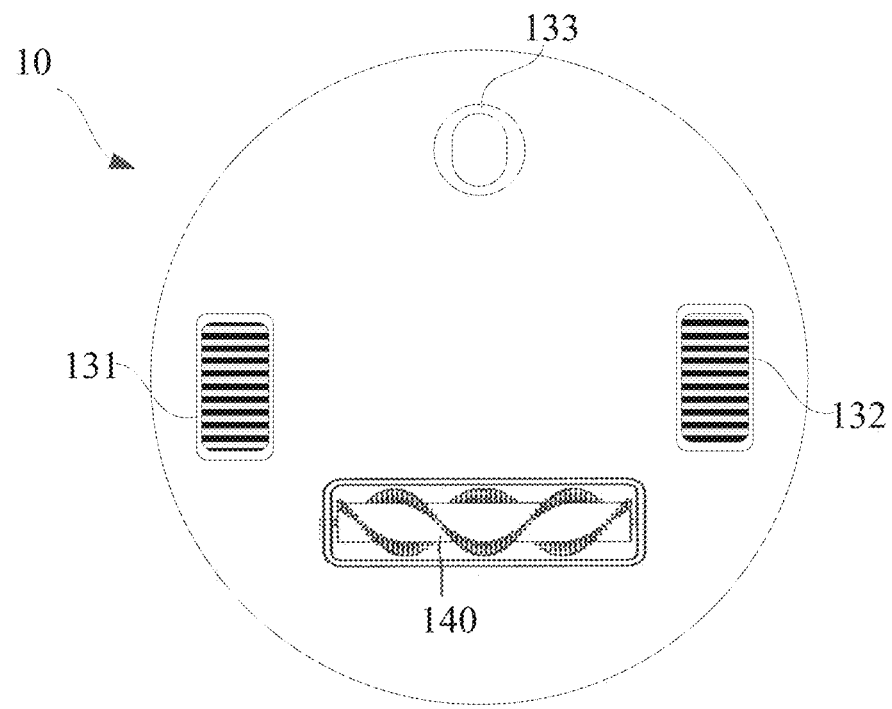
FIG. 2 is a schematic diagram of a cleaning robot according to some embodiments of the present disclosure.

FIG. 1 and FIG. 2 are schematic diagrams of a cleaning robot according to various embodiments of the present disclosure. FIG. 1 illustrates a top view of a cleaning robot 10 according to some embodiments. FIG. 2 illustrates a bottom view of the cleaning robot 10. As illustrated in FIG. 1 and FIG. 2, the cleaning robot 10 includes a body 110, a detection component 120, a left wheel 131, a motor (not shown) connected to the left wheel 131, a right wheel 132, a motor (not shown) connected to the right wheel 132, and a main brush 140.

The body 110 forms a housing of the cleaning robot and accommodates other components.

In some embodiments, the body 110 has a flat cylindrical shape.

The detection component or detector 120 is configured to measure peripheral environment of the cleaning robot, so as to find environmental objects such as obstacles, walls, steps, etc.

The detection component 120 may also be configured to determine a motion state of the cleaning robot. The determining operation may be performed by a determining portion, an acquiring portion, a calculation component, a processor or processing circuit, which may be part of the detection component or detector 120, or a separate component/function.

The detection component 120 may include an odometer, a Laser Distance Sensor (LDS), a cliff sensor, a triaxial accelerometer, a gyroscope and a collision sensor. In some embodiments, the detection component 120 may also include an infrared sensor, an ultrasonic sensor, a camera, a Hall sensor, and the like.

In the embodiment, the number and position of the detection component 120 are not limited.

A left side of the body 110 of cleaning robot is provided with a left wheel 131, and a right side of the body 110 of cleaning robot is provided with a right wheel 132. The left wheel 131 and the right wheel 132 are arranged in parallel on the left and right sides of the body 110 of cleaning robot. The left wheel 131 and the right wheel 132 are controlled by respective connected motors.

The left side of the body 110 of cleaning robot is also provided with a motor connected to the left wheel 131. A drive circuit of the motor connected to the left wheel 131 is connected to the controller of the cleaning robot. The controller can send a first control signal corresponding to a different duty ratio to the drive circuit of the motor, and the drive circuit of the motor can generate a corresponding drive current according to the first control signal to rotate the motor, so as to control a drive direction and a rotation speed of the left wheel 131. The duty ratio refers to a ratio of an energizing time to an energizing cycle of a pulse signal. The greater the duty ratio is, the greater the rotation speed of the left wheel 131 is, and the smaller the duty cycle is, the smaller the rotation speed of the left wheel 131 is.

For example, the drive circuit of the motor connected to the left wheel 131 receives a first control signal corresponding to a duty ratio ½ sent by the controller, and generates a corresponding drive current according to the first control signal, under the action of the drive current, the motor connected to the left wheel 131 controls the drive direction of the left wheel 131 to be a forward direction, and the rotation speed of the left wheel 131 to be 50 rpm.

The right side of the body 110 of cleaning robot is also provided with a motor connected to the right wheel 132. A drive circuit of the motor connected to the right wheel 132 is connected to the controller of the cleaning robot. The controller can send a second control signal corresponding to a different duty ratio to the drive circuit of the motor, and the drive circuit of the motor can generate a corresponding drive current according to the second control signal to rotate the motor, so as to control a drive direction and a rotation speed of the right wheel 132.

For example, the drive circuit of the motor connected to the right wheel 132 receives a second control signal corresponding to a duty ratio ½ sent by the controller, and generates a corresponding drive current according to the second control signal, under the action of the drive current, the motor connected to the right wheel 132 controls the drive direction of the right wheel 132 to be a forward direction, and the rotation speed of the right wheel 132 to be 50 rpm.

The left wheel 131, the motor connected to the left wheel 131, the right wheel 132 and the motor connected to the right wheel 132 of the cleaning robot 10 define a drive component of the cleaning robot 10.

In some embodiments, the cleaning robot 10 further includes a guide wheel 133 arranged at the front of the body 110. The guide wheel 133 is configured to change a traveling direction of the cleaning robot during traveling.

The main brush 140 is mounted at the bottom of the body 110. In some embodiments, the main brush 140 may be a drum-shaped brush that rotates with respect to a contact surface in a roller type.

It should be noted that, the cleaning robot may also include other modules or components, or only include the above partial modules or components, which is not limited in the embodiment, and only the above cleaning robot is taken as an example for illustration.

The various device components, units, blocks, circuits or portions may have modular configurations, or are composed of discrete components, but nonetheless may be referred to as "modules," "components," "units," "blocks," "circuits," or "portions" in general. In other words, the "modules," "components," "units," "blocks," "circuits," or "portions" referred to herein may or may not be in modular forms, and these phrases may be interchangeably used.

Figure 3:
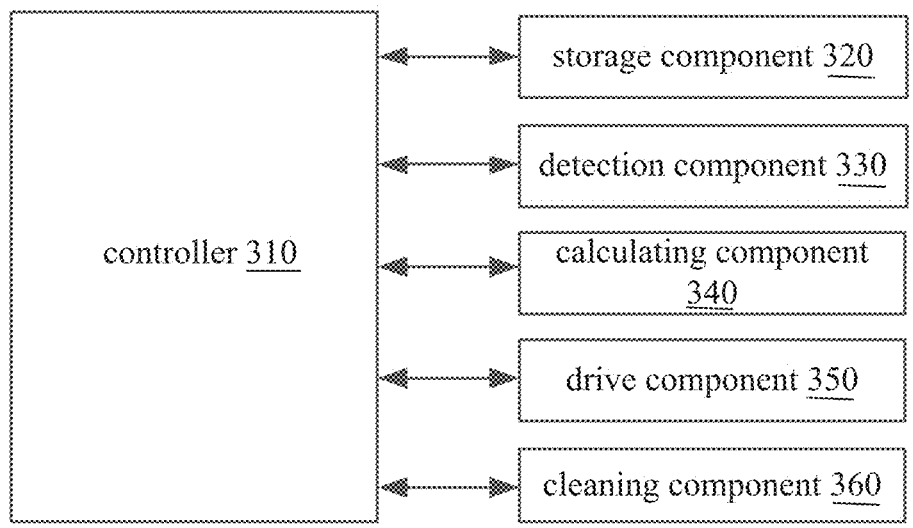
FIG. 3 is a schematic diagram of a cleaning robot according to some embodiments of the present disclosure.

FIG. 3 is a block diagram of a cleaning robot according to some embodiments. The cleaning robot includes a controller 310, a storage component 320, a detection component 330, a calculating component 340, a drive component 350, and a cleaning component 360.

The controller 310 is configured to control overall operations of the cleaning robot. Upon reception of a cleaning command, the controller 310 can control the cleaning robot to travel in a forward direction or in a backward direction according to a preset logic, and perform cleaning during traveling. Upon reception of a traveling command, the controller 310 can control the cleaning robot to travel on a traveling path in a predetermined traveling mode. The embodiment does not repeat other commands received by the controller 310 from users.

The storage component 320 is configured to store at least one instruction. The instructions may include an instruction configured to perform a predetermined traveling mode and traveling path, an instruction configured to perform cleaning, an instruction configured to detect whether an obstacle obstruction state is entered, an instruction configured to calculate an inclined angle, an instruction configured to detect whether the inclined angle is greater than a first angle, and the like. The storage component 320 is also configured to store position data of the cleaning robot during traveling, a traveling speed during traveling, a traveling mileage, data related to obstacles, and the like.

The detection component 330 is configured to detect obstacles in a traveling area of the cleaning robot and a traveling state of the cleaning robot. The obstacles may be furniture, household appliances, office equipment, brick walls, wooden walls, wires on the ground, door sills between rooms, etc.

The calculating component 340 is configured to calculate an inclined angle of the cleaning robot when the cleaning robot is in the obstacle obstruction state, and calculate a distance of the cleaning robot to the obstacle in the traveling area.

For example, the calculating component 340 can calculate the inclined angle of the cleaning robot through a triaxial accelerometer, or the calculating component 340 can calculate the inclined angle of the cleaning robot through a gyroscope, or the calculating component 340 can acquire the inclined angle of the cleaning robot through a six-axis gyroscope, or the calculating component 340 can calculate the inclined angle of the cleaning robot by a distance of the cleaning robot to the obstacle or by a traveling distance of the cleaning robot.

In some embodiments, the calculating component 340 is also referred to as the determining portion or acquiring portion configured to determine whether the cleaning robot is in an obstacle obstruction state. Such a determining function can be realized, for example, using logic circuits, a processor executing a software program, etc.

The drive component 350 is configured to control a drive direction and a rotation speed of the first drive wheel according to a first control signal of the controller 310, or control a drive direction and a rotation speed of the second drive wheel according to a second control signal of the controller 310.

The cleaning component 360 is configured to control the main brush at the bottom of the cleaning robot to clean a contact surface contacting the main brush in a rolling manner during traveling, when a cleaning command received and the controller 310 controls the cleaning robot to travel in a forward direction or in a backward direction according to a preset logic.

In some embodiments, the controller 310 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, which is configured to perform the method for controlling a cleaning robot provided in embodiments of the present disclosure.

In some embodiments, when the drive component 350 drives the cleaning robot to travel, the detection component 330 is configured to detect whether the cleaning robot is in an obstacle obstruction state.

When the cleaning robot is in the obstacle obstruction state, the controller 310 is configured to control the first drive wheel to cross an obstacle and control the second drive wheel to cross the obstacle according to a detection result acquired by the detection component 330 and the calculating component 340.

In some embodiments, when the controller 310 controls the first drive wheel to cross the obstacle and controls the second drive wheel to cross the obstacle according to the detection result acquired by the detection component 330 and the calculating component 340, the controller 310 is configured to control the first drive wheel to cross the obstacle, and control the second drive wheel to cross the obstacle when the detection result acquired by the detection component 330 and the calculating component 340 indicates that the cleaning robot is in the obstacle obstruction state and an inclined angle of the cleaning robot is less than a first angle.

In some embodiments, when the controller 310 controls the first drive wheel to cross the obstacle, the controller 310 is configured to control the first drive wheel to travel in a first traveling direction, and control the second drive wheel to travel in a second traveling direction; or control the first drive wheel to travel in the first traveling direction at a first speed, and control the second drive wheel to travel in the first traveling direction at a second speed, the first speed being greater than the second speed; or control the first drive wheel to travel in the first traveling direction, and control the second drive wheel to remain stationary.

The first traveling direction is a traveling direction of the cleaning robot before the cleaning robot enters the obstacle obstruction state, and the second traveling direction is opposite to the first traveling direction.

In some embodiments, when the controller 310 controls the second drive wheel to remain stationary, the controller 310 is configured to control a drive direction of the second drive wheel to be the first traveling direction and a rotation speed of the second drive wheel to be zero.

In some embodiments, after the controller 310 controls the rotation speed of the second drive wheel to be zero, the detection component 330 detects whether the second drive wheel rotates to the second traveling direction, when the second drive wheel rotates to the second traveling direction, the controller 310 controls the second drive wheel to output a rotation force along the first traveling direction to remain stationary.

In some embodiments, when the controller 310 controls the second drive wheel to cross the obstacle, the controller 310 is configured to control the second drive wheel to travel in a first traveling direction, and control the first drive wheel to travel in a second traveling direction; or control the second drive wheel to travel in the first traveling direction at a first speed, and control the first drive wheel to travel in the first traveling direction at a second speed, the first speed being greater than the second speed; or control the second drive wheel to travel in the first traveling direction, and control the first drive wheel to remain stationary.

The first traveling direction is a traveling direction of the cleaning robot before the cleaning robot enters the obstacle obstruction state, and the second traveling direction is opposite to the first traveling direction.

In some embodiments, when the controller 310 controls the first drive wheel to remain stationary, the controller 310 is configured to control a drive direction of the first drive wheel to be the first traveling direction and a rotation speed of the first drive wheel to be zero.

In some embodiments, after the controller 310 controls the rotation speed of the first drive wheel to be zero, it is detected whether the first drive wheel rotates to the second traveling direction, and when the first drive wheel rotates to the second traveling direction, the controller 310 is configured to control the first drive wheel to output a rotation force along the first traveling direction to remain stationary.

In some embodiments, when the detection result acquired by the detection component 330 and the calculating component 340 indicates that an inclined angle of the cleaning robot is greater than a first angle, the controller 310 is configured to control the cleaning robot to travel in a second traveling direction. The second traveling direction is opposite to a first traveling direction, and the first traveling direction is the traveling direction of the cleaning robot before the cleaning robot enters the obstacle obstruction state.

In some embodiments, when the detection result acquired by the detection component 330 and the calculating component 340 indicates that the cleaning robot is in the obstacle obstruction state and an inclined angle of the cleaning robot is less than a second angle, the controller 310 is configured to control the cleaning robot to travel in a second traveling direction. The second traveling direction is opposite to a first traveling direction, the first traveling direction is the traveling direction of the cleaning robot before the cleaning robot enters the obstacle obstruction state, and the second angle is less than the first angle.

In some embodiments, the detection component 330 detects whether the first drive wheel crosses the obstacle. When the detection component 330 detects that the first drive wheel does not cross the obstacle, a number of occurrences that the first drive wheel does not cross the obstacle is recorded. When the number of occurrences of not crossing the obstacle is greater than a preset value, the controller 310 controls the cleaning robot to travel in a second traveling direction. A first traveling direction is a traveling direction of the cleaning robot before the cleaning robot enters the obstacle obstruction state.

In some embodiments, the detection component 330 detects whether the first drive wheel crosses the obstacle. When the detection component 330 detects that the first drive wheel crosses the obstacle, the controller 310 controls the second drive wheel to cross the obstacle.

In some embodiments, in a situation that the cleaning robot is in the obstacle obstruction state, when the controller 310 controls the first drive wheel to cross the obstacle and controls the second drive wheel to cross the obstacle according to the detection result acquired by the detection component 330 and the calculating component 340, the controller 310 is configured to control the first drive wheel to cross the obstacle, and control the second drive wheel to cross the obstacle when the cleaning robot is in the obstacle obstruction state and there is an obstruction obstacle in a direction parallel to a traveling direction of the cleaning robot and perpendicular to a contact surface.

The first drive wheel is a drive wheel close to the obstruction obstacle, and the second drive wheel is a drive wheel away from the obstruction obstacle.

In some embodiments, when the detection component 330 detects whether the cleaning robot is in the obstacle obstruction state, the detection component 330 is configured to detect whether the drive wheel is in a slipping state. The slipping state being a state in which the drive wheel rotates on a contact surface in a sliding manner. When the drive wheel is in the slipping state, it is determined that the cleaning robot is in the obstacle obstruction state.

In some embodiments, when the detection component 330 detects whether the cleaning robot is in the obstacle obstruction state, the detection component 330 is configured to detect whether the drive wheel is in a stuck state. The stuck state being a state in which the drive wheel is stopped by an external force during rotation. When the drive wheel is in the stuck state, it is determined that the cleaning robot is in the obstacle obstruction state.

In some embodiments, when the detection component 330 detects whether the cleaning robot is in the obstacle obstruction state, the detection component 330 is configured to acquire a traveling mileage of the drive wheel and a position of the cleaning robot, and determine that the cleaning robot is in the obstacle obstruction state when a variation value of the traveling mileage is beyond a preset range and the position of the cleaning robot does not change.

In some embodiments, when the detection component 330 detects whether the cleaning robot is in the obstacle obstruction state, the detection component 330 is configured to detect whether a drive current of the drive component is greater than a preset current value, and determine that the cleaning robot is in the obstacle obstruction state when the drive current is greater than the preset current value.

In some embodiments, when the detection component 330 detects whether the cleaning robot is in the obstacle obstruction state, the detection component 330 is configured to detect whether the cleaning robot is inclined, and determine that the cleaning robot is in the obstacle obstruction state when the cleaning robot is inclined.

In some embodiments, there is also provided a non-transitory computer readable storage medium including instructions, such as the storage component 320 includes instructions. The instructions may be executed by the controller 310 to implement the method for controlling a cleaning robot according to embodiments of the present disclosure. For example, the non-transitory computer readable storage medium may be a ROM, a random-access memory (RAM), a CD-ROM, a magnetic tape, a floppy disk, an optical data storage device, and the like.

In the following embodiments, the left wheel of the cleaning robot is determined as the first drive wheel, and the right wheel of the cleaning robot is determined as the second drive wheel. In other possible embodiments, the right wheel of the cleaning robot may be determined as the first drive wheel, and the left wheel of the cleaning robot may be determined as the second drive wheel, which is not limited in embodiments of the present disclosure.

Figure 4:
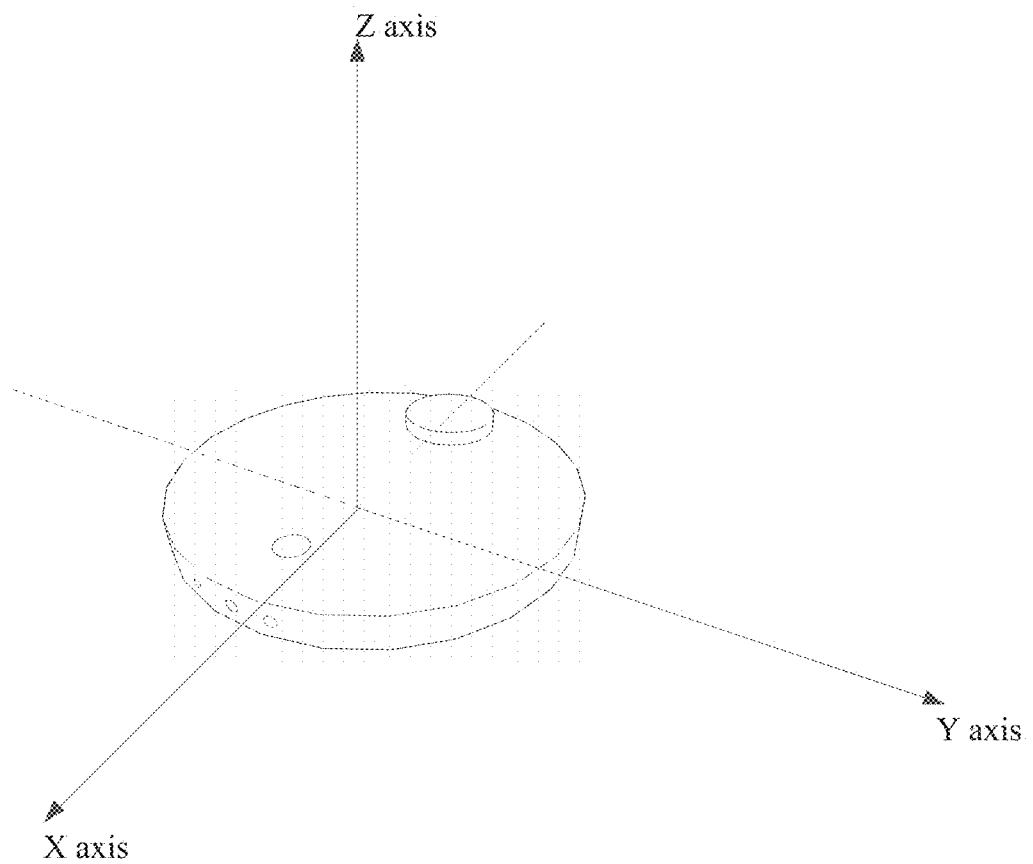
FIG. 4 is a schematic diagram of a coordinate system according to some embodiments of the present disclosure.

To conveniently describe the behavior of the cleaning robot, as illustrated in FIG. 4, a coordinate system based on the cleaning robot is established. The coordinate system includes an X axis, a Y axis, and a Z axis. The origin of the coordinate system is the center point of the cleaning robot. Any two of the three axes of the X axis, the Y axis and the Z axis are perpendicular to each other. The X axis and the Y axis are in a same plane, the X axis is parallel to a front-rear axis of the body of the cleaning robot, and the Y axis of the coordinate system is parallel to a transverse axis of the body of the cleaning robot. The Z axis is perpendicular to the plane defined by the X axis and the Y axis, and the Z axis of the coordinate system is parallel to a vertical axis of the body of the cleaning robot. A drive direction forward along the X axis is the forward direction, and a drive direction backward along the X axis is the backward direction.

Embodiments of the present disclosure may describe a method for crossing an obstacle based on the above cleaning robot, but embodiments of the present disclosure do not define the type of the cleaning robot.

Figure 5A:
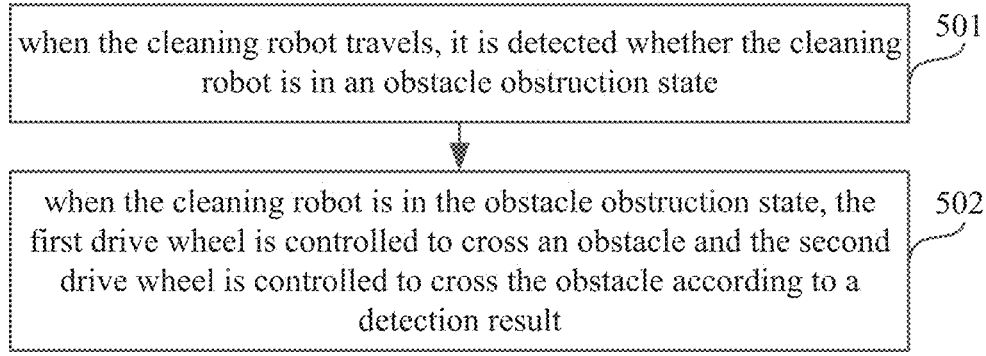
FIG. 5A is a flow chart of a method for crossing an obstacle according to some embodiments of the present disclosure.

Referring to FIG. 5, which illustrates a flow chart of a method for crossing an obstacle according to some embodiments. The method for crossing an obstacle may include followings.

At block 501, when the cleaning robot travels, it is detected whether the cleaning robot is in an obstacle obstruction state.

In some embodiments, the cleaning robot may travel in a forward direction, or in a backward direction.

In some embodiments, the obstacle may be a bar with some hardness and a small height, such as a gate stone between adjacent rooms, or the obstacle may be a soft and deformable thread, such as a wire.

Figure 5B:
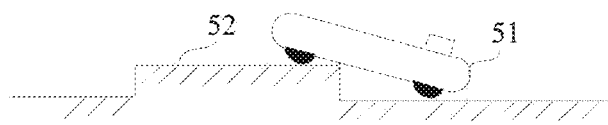
FIG. 5B is a schematic diagram of an obstacle obstruction state according to some embodiments of the present disclosure.

The obstacle obstruction state of the cleaning robot means that two drive wheels of the cleaning robot do not cross the obstacle, and the body of the cleaning robot is inclined. As illustrated in FIG. 5B, which illustrates that the cleaning robot 51 is obstructed by a gate tone 52 when passing through two rooms, the first drive wheel and the second drive wheel do not cross the gate tone 52, and the body of the cleaning robot 51 is inclined.

At block 502, when the cleaning robot is in the obstacle obstruction state, the first drive wheel is controlled to cross an obstacle and the second drive wheel is controlled to cross the obstacle according to a detection result.

In some embodiments, when the cleaning robot is in the obstacle obstruction state, the logic of whether to cross the obstacle is performed depending on different detection results of the obstacle obstruction state of the cleaning robot.

As described above, with the method for crossing an obstacle according to embodiments of the present disclosure, when the cleaning robot travels, it is detected whether the cleaning robot is in an obstacle obstruction state, when the cleaning robot is in the obstacle obstruction state, in combination with other data of sensors, a decision of whether to control the cleaning robot to cross the obstacle is made. When it is decided to cross the obstacle, the first drive wheel is controlled to cross the obstacle, and the second drive wheel is controlled to cross the obstacle, problems that the cleaning robot cannot continue a cleaning task due to obstruction of obstacles during traveling are avoided, thereby allowing the cleaning robot to independently cross the obstacle, and improving workability of the cleaning robot.

Figure 6A:
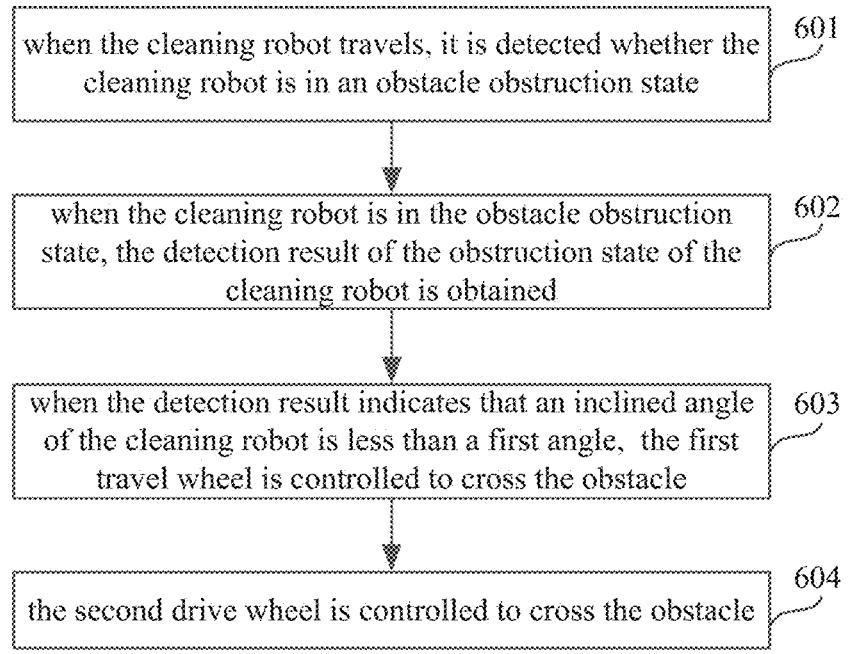
FIG. 6A is a flow chart of a method for crossing an obstacle according to some embodiments of the present disclosure.

Referring to FIG. 6A, which illustrates a flow chart of a method for crossing an obstacle according to another exemplary embodiment. The method for crossing an obstacle may include followings.

At block 601, when the cleaning robot travels, it is detected whether the cleaning robot is in an obstacle obstruction state.

In some embodiments, the cleaning robot may travel in a forward direction, or in a backward direction.

When the cleaning robot travels in the forward direction, it means that the cleaning robot travels in a positive direction of the X axis, and when the cleaning robot travels in a direction opposite to the positive direction of the X axis, it means that the cleaning robot travels in the backward direction.

In some embodiments, it is determined whether the cleaning robot is in the obstacle obstruction state by detecting whether the first drive wheel and the second drive wheel are in a slipping state. The slipping state is a state in which the drive wheel rotates on a contact surface in a sliding manner. The contact surface is a plane where the cleaning robot performs a cleaning task, such as ground or a desktop. When the drive wheel is in the slipping state, it is determined that the cleaning robot is in the obstacle obstruction state.

In some embodiments, it is determined whether the cleaning robot is in the obstacle obstruction state by detecting whether the first drive wheel and the second drive wheel are in a stuck state. The stuck state is a state in which the drive wheel is stopped by an external force during rotation. When the drive wheel is in the stuck state, it is determined that the cleaning robot is in the obstacle obstruction state.

In some embodiments, a distance to a front obstacle can be measured through an LDS, and a traveling mileage of the drive wheel can be acquired through an odometer. When a relationship between a variation value of the traveling mileage and a distance to the front obstacle does not conform to a law of change between a variation value of the traveling mileage and a distance to the front obstacle when the cleaning robot travels normally, it is determined that the cleaning robot is in the obstacle obstruction state. This method is a method for detect the slipping state of the drive wheel, and other methods can be also designed according to motion characteristics and electrical characteristics of wheels in slipping behavior.

Figure 6B:
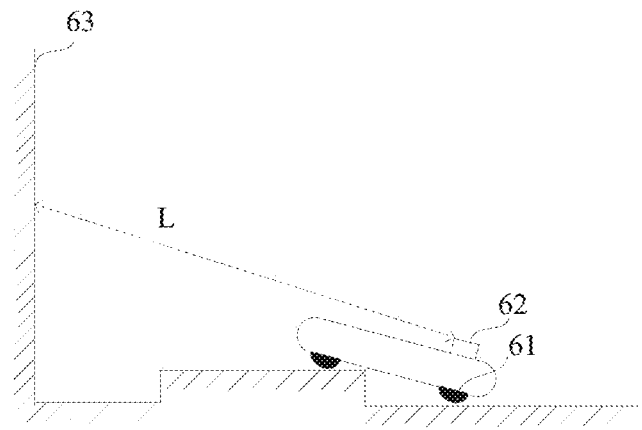
FIG. 6B is a schematic diagram of an implementation of detecting an obstacle obstruction state according to another exemplary embodiment of the present disclosure.

As illustrated in FIG. 6B, the drive wheel 61 of the cleaning robot is rotating, but a distance L to the front obstacle 63 measured by the LDS 62 of the cleaning robot does not change, the relationship between the variation value of the traveling mileage and the distance L does not conform to the law of change during normal traveling, it is determined that the cleaning robot is in the obstacle obstruction state. Normal traveling refers to a working state that the cleaning robot is not obstructed by the obstacle.

In some embodiments, it is determined whether the cleaning robot is in the obstacle obstruction state by detecting whether a drive current of the motor connected to the drive wheel is greater than a drive current when the cleaning robot travels normally. When the drive current of the motor connected to the drive wheel is greater than a preset current value, it is determined that the cleaning robot is in the obstacle obstruction state. The preset current value is a value greater than a maximum current value during normal traveling of the cleaning robot. This method is a method for detect the stuck state of the drive wheel, and other methods can be also designed according to motion characteristics and electrical characteristics of wheels in stuck behavior.

In some embodiments, it is determined whether the cleaning robot is in the obstacle obstruction state by detecting whether the cleaning robot is inclined. When the cleaning robot is inclined, it is determined that the cleaning robot is in the obstacle obstruction state.

At block 602, when the cleaning robot is in the obstacle obstruction state, the detection result of the obstruction state of the cleaning robot is acquired.

According to the detection component and the calculating component of the cleaning robot, the detection result indicating a state of the body of the cleaning robot when the cleaning robot is in the obstacle obstruction state can be acquired, and the inclined angle of the cleaning robot can be acquired. The detection result can be determined according to the inclined angle, when the detection result indicates that the inclined angle of the cleaning robot is less than the first angle, block 603 is performed.

In some embodiments, in general, the first angle is an angle at which the body of the cleaning robot is inclined when the cleaning robot is in the obstacle obstruction state and the obstacle can be crossed.

In some embodiments, the first angle is a maximum angle at which the body of the cleaning robot is inclined when the cleaning robot is in the obstacle obstruction state and the obstacle can be crossed. For example, the cleaning robot can cross an obstacle with a height of two centimeters, when the cleaning robot is obstructed the obstacle with the height of two centimeters, the body of the cleaning robot is inclined, and the inclined angle is 5 degree, i.e., the first angle is 5 degree.

There are several following ways to acquire the inclined angle of the cleaning robot.

First, an average acceleration component of the cleaning robot on the X axis is acquired through a triaxial accelerometer, and the inclined angle is determined according to a pre-stored correspondence between the average acceleration component and the inclined angle.

The storage component of the cleaning robot stores a one-to-one correspondence between the average acceleration component on the X axis and the inclined angle. After the calculating component of the cleaning robot acquires the average acceleration component on the X axis, the corresponding inclined angle can be determined.

Second, the inclined angle of cleaning robot is acquired through a six-axis gyroscope.

The six-axis gyroscope is a device having functions of the triaxial accelerometer and the triaxial gyroscope, the calculating component of the cleaning robot acquires a Euler angle of the cleaning robot through the six-axis gyroscope, i.e., the inclined angle of the cleaning robot is acquired.

Figure 6C:
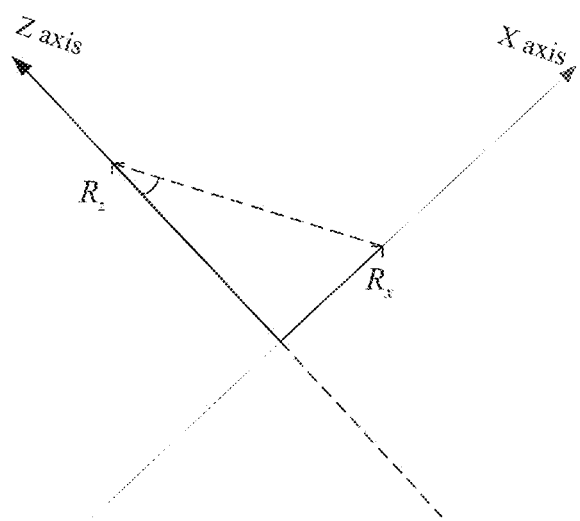
FIG. 6C is a schematic diagram of an implementation of acquiring an inclined angle according to another exemplary embodiment of the present disclosure.

Third, as illustrated in FIG. 6C, through the triaxial accelerometer, an acceleration component $R_x$ of the cleaning robot in the X axis direction is acquired, and an acceleration component $R_z$ in the Z axis direction is acquired, the inclined angle θ of the cleaning robot can be acquired by the following Formula (1).

$$\theta = \arctan\left(\frac{R_x}{R_z}\right) \quad (1)$$

Fourth, through a gyroscope, an instantaneous angular velocity acquired according to a preset interval is acquired during a time period of the cleaning robot from normal traveling to the obstacle obstruction state, and the acquired instantaneous angular velocity and the time period are integrated to calculate the inclined angle θ. The preset time interval is a sampling time interval, and the inclined angle θ is calculated by the following Formula (2).

$$\theta = \int_{T_1} w_1 dt + \ldots\ldots + \int_{T_n} w_n dt, T_1 + \ldots\ldots + T_2 = T \quad (2)$$

where $w_n$ is an instantaneous angular velocity, and T is the time period from normal traveling to the obstacle obstruction state.

Fifth, through a gyroscope, an instantaneous angular velocity acquired according to a preset time interval is acquired during a time period of the cleaning robot from a first time point to a second time point, the acquired instantaneous angular velocity and the time period are integrated to calculate the inclined angle $\theta_1$, and then a offset value of the gyroscope is calculated through an accelerometer, and a more accurate inclined angle $\theta_2$ is calculated according to a fusion algorithm of the gyroscope and the accelerometer. The first time point is a time point when the cleaning robot enters the obstacle obstruction state, and the second time point is a latest time point before the cleaning robot enters the obstacle obstruction state.

Sixth, through a LDS, a distance L1 of the cleaning robot to a front obstacle at the first time point when the cleaning robot travels normally is acquired, a distance L2 of the cleaning robot to the front obstacle at the second time point when the cleaning robot is in the obstacle obstruction state is acquired, a theoretical distance L3 to the front obstacle at the second time point is calculated according to a traveling speed of the cleaning robot during normal traveling, and the inclined angle of the cleaning robot is calculated by the following Formula (3).

$$\theta = \arccos\left(\frac{L_3}{L_2}\right) \quad (3)$$

In some embodiments, the front obstacle is not an obstacle that causes the cleaning robot to enter the obstacle obstruction state. For example, the obstacle that causes the cleaning robot to enter the obstacle obstruction state is a wire, and the front obstacle is a wall in front of the wire.

Figure 6D:
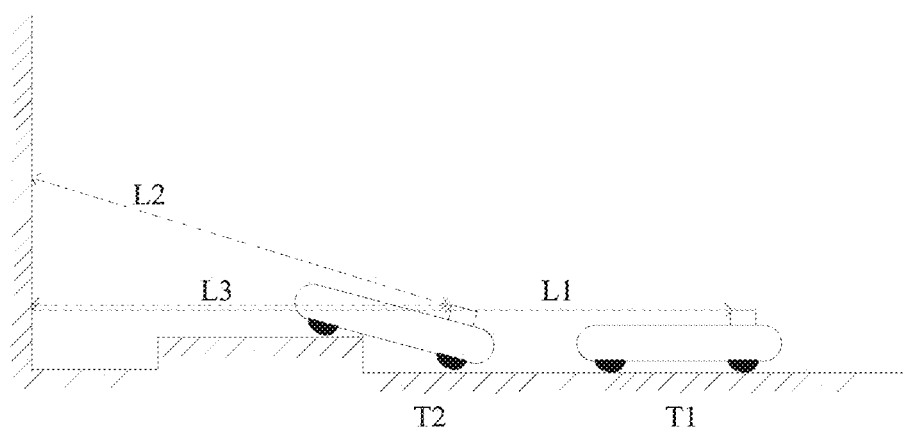
FIG. 6D is a schematic diagram of an implementation of acquiring an inclined angle according to another exemplary embodiment of the present disclosure.

As illustrated in FIG. 6D, the distance to the front obstacle is measured as L1=10 at the time point T1, the distance to the front obstacle is measured as L2=5 at the time point T2, the theoretical distance is calculated as L3=4, according to the relationship between L2 and L3, the inclined angle can be acquired by the formula three.

Seventh, through a cliff sensor, a distance L4 of the cleaning robot to the ground at the first time point when the cleaning robot travels normally is acquired, a distance L5 of the cleaning robot to the ground at the second time point when the cleaning robot is in the obstacle obstruction state is acquired, and a linear distance L6 between the cleaning robot at the first time point and at the second time point is acquired, the inclined angle is acquired by the following Formula (4).

$$\theta = \arctan\left(\frac{L_6}{(L_5 - L_4)}\right) \quad (4)$$

Figure 6E:
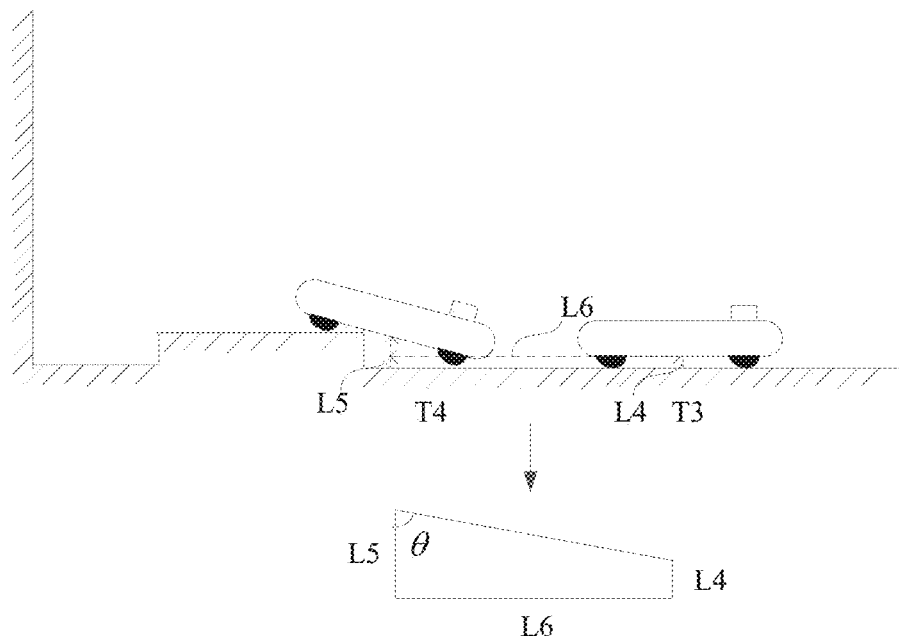
FIG. 6E is a schematic diagram of an implementation of acquiring an inclined angle according to another exemplary embodiment of the present disclosure.

As illustrated in FIG. 6E, the upper part of FIG. 6E illustrates the distance L4 measured at the time point T3, the distance L5 measured at the time point T4, and the linear distance L6 between the cleaning robot at the time point T3 and at the time point T4. The lower part of FIG. 6E illustrates a triangular relationship between L4, L5, and L6, the inclined angle is acquired according to the Formula four.

It should be noted that, ordinal numbers such as "first," "second" and "third" mentioned in embodiments of the present disclosure should be understood as merely for distinguishing unless they are meant to express order according to the context.

When the detection result indicates that the inclined angle is greater than the first angle, the cleaning robot is controlled to travel in a second traveling direction. The second traveling direction is opposite to a first traveling direction. The first traveling direction is a traveling direction of the cleaning robot before the obstacle obstruction state is entered.

In some embodiments, when the inclined angle is greater than a first angle, the cleaning robot can also be controlled to rotate a certain angle before it is controlled to travel in a traveling direction opposite to the traveling direction before the obstacle obstruction state is entered, that is, when the inclined angle is greater than the first angle, the cleaning robot does not cross the obstacle.

When the detection result indicates that the inclined angle is less than a second angle, the cleaning robot is controlled to travel in a traveling direction opposite to the traveling direction before the obstacle obstruction state is entered. The second angle is less than the first angle.

The second angle is an angle at which the cleaning robot is inclined when the cleaning robot is in the obstacle obstruction state and the obstacle is an immovable obstacle obstructing traveling of the cleaning robot in a vertical direction on the traveling path of the cleaning robot. In general, the second angle is close to zero. For example, in the process of getting out of trouble, the cleaning robot performs a retreat operation, but the cleaning robot is obstructed by a rear obstacle (such as obstructed by a wall), and then the cleaning robot is controlled to travel forward, because the forward direction is opposite to the previous traveling direction, i.e., the backward direction. For another example, when a collision sensor in front of the cleaning robot is continuously triggered, the cleaning robot performs a retreat operation, but the cleaning robot may be obstructed by a rear obstacle during retreat, and then cleaning robot is controlled to travel forward.

It should be noted that, ordinal numbers such as "first," "second" and "third" mentioned in embodiments of the present disclosure should be understood as merely for distinguishing unless they are meant to express order according to the context.

At block 603, the first travel wheel is controlled to cross the obstacle.

There may be several ways to control the first drive wheel to cross the obstacle.

First, the first drive wheel is controlled to travel in a first traveling direction, and the second drive wheel is controlled to travel in a second traveling direction. The first traveling direction is opposite to the second traveling direction.

The first traveling direction is a traveling direction of the cleaning robot before the cleaning robot enters the obstacle obstruction state.

Figure 6F:
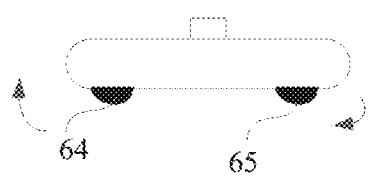
FIG. 6F is a schematic diagram of an implementation of a method for crossing an obstacle according to another exemplary embodiment of the present disclosure.

Assuming that the first traveling direction is a forward direction, and the second traveling direction is a backward direction, as illustrated in FIG. 6F, the first drive wheel 64 travels in the forward direction, and the second drive wheel 65 travels in the backward direction.

In some embodiments, the traveling speed of the first drive wheel is greater than a traveling speed during normal traveling. Normal traveling refers to a working state that the cleaning robot is not obstructed by the obstacle.

In some embodiments, the speed at which the first drive wheel travels in the first traveling direction is greater than the speed at which the second drive wheel travels in the second traveling direction.

Second, the first drive wheel is controlled to travel in the first traveling direction at a first speed, and the second drive wheel is controlled to travel in the first traveling direction at a second speed. The first speed is greater than the second speed.

The first traveling direction is a traveling direction of the cleaning robot before the cleaning robot enters the obstacle obstruction state.

In order to ensure that the first drive wheel crosses the obstacle first, the first speed of the first drive wheel is greater than the second speed of the second drive wheel. For example, the first traveling direction is a forward direction, the first drive wheel travels in the forward direction at a speed of 40 meters/hour, and the second drive wheel travels in the forward direction at a speed of 20 meters/hour. In some embodiments, the first speed is greater than a speed during normal traveling. For example, the speed during normal traveling is 30 meters/hour, and the first speed is 40 meters/hour. Normal traveling refers to a working state that the cleaning robot is not obstructed by the obstacle.

Figure 6G:
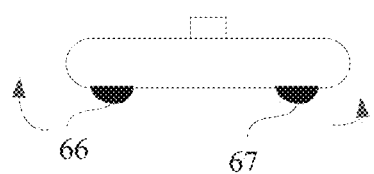
FIG. 6G is a schematic diagram of an implementation of a method for crossing an obstacle according to another exemplary embodiment of the present disclosure.

Assuming that the first traveling direction is the forward direction, as illustrated in FIG. 6G, the first drive wheel 66 travels in the forward direction at the first speed, and the second drive wheel 67 travels in the forward direction at the second speed.

Third, the first drive wheel is controlled to travel in the first traveling direction, and the second drive wheel is controlled to remain stationary.

The first traveling direction is a traveling direction of the cleaning robot before the cleaning robot enters the obstacle obstruction state.

In some embodiments, controlling the second drive wheel to remain stationary refers to that a drive direction of the second drive wheel is controlled to be the first traveling direction and a rotation speed of the second drive wheel to be zero.

In some embodiments, the rotation speed of the drive wheel can be controlled to be zero by controlling the duty ratio to be zero. When the drive direction of the second drive wheel is the first traveling direction and the rotation speed is zero, a reverse rotation resistance of the second drive wheel increases, which can play a certain degree of braking effect, and help the first drive wheel to cross the obstacle.

In some embodiments, after the rotation speed of the second drivee wheel is controlled to be zero, since the first drive wheel travels in the first traveling direction, the force caused thereby may drive the second drive wheel to rotate to the second traveling direction. It is detected whether the second drive wheel rotates to the second traveling direction, and when the second drive wheel rotates to the second traveling direction, the second drive wheel is controlled to output a rotation force along the first traveling direction to remain stationary.

By controlling the second drive wheel to output the rotation force along the first traveling direction to remain stationary, the second drive wheel can be caused to generate a rotation force to the first traveling direction by giving a small duty ratio current to the motor connected to the second drive wheel, the generated rotation force can counteract the force given to the second drive wheel to rotate to the second traveling direction when the first drive wheel travels in the first traveling direction, such that the second drive wheel remains stationary. The first traveling direction is a traveling direction of the cleaning robot before the cleaning robot enters the obstacle obstruction state, and the first traveling direction is opposite to the second traveling direction.

It should be noted that, ordinal numbers such as "first", "second" and "third" mentioned in embodiments of the present disclosure should be understood as merely for distinguishing unless they are meant to express order according to the context.

In addition, when it is detected that the cleaning robot is in the obstacle obstruction state, and there is an obstruction obstacle in a direction parallel to the traveling direction of the cleaning robot and perpendicular to a contact surface, the first drive wheel is controlled to cross the obstacle. The first drive wheel is a drive wheel close to the obstruction obstacle.

In some embodiments, the obstruction obstacle is not an obstacle that obstructs the cleaning robot to enter the obstacle obstruction state, and obstruction obstacle is the obstacle that the cleaning robot cannot move its position by hitting.

For example, the obstruction obstacle is a wall, that is, the cleaning robot is obstructed by the obstacle when traveling along the wall, in order to prevent the cleaning robot from hitting the wall due to the rotation generated during a single wheel crossing, the drive wheel close to the wall first crosses the obstacle, i.e., the body rotates away from the wall.

At block 604, the second drive wheel is controlled to cross the obstacle.

The second drive wheel is controlled to cross the obstacle. The method for controlling the second drive wheel to cross the obstacle is similar to that of controlling the first drive wheel to cross the obstacle, and there are several implementations.

First, the second drive wheel is controlled to travel in a first traveling direction, and the first drive wheel is controlled to travel in a second traveling direction. The first traveling direction is opposite to the second traveling direction, and the first traveling direction is a traveling direction of the cleaning robot before the cleaning robot enters the obstacle obstruction state.

In some embodiments, a traveling speed of the second drive wheel is greater than a traveling speed during normal traveling. Normal traveling refers to a working state that the cleaning robot is not obstructed by the obstacle.

In some embodiments, a speed at which the second drive wheel travels in the first traveling direction is greater than a speed at which the first drive wheel travels in the second traveling direction.

Second, the second drive wheel is controlled to travel in the first traveling direction at a first speed, and the first drive wheel is controlled to travel in the first traveling direction at a second speed. The first speed is greater than the second speed.

In order to ensure that the second drive wheel crosses the obstacle, the first speed of the second drive wheel is greater than the second speed of the first drive wheel.

Third, the second drive wheel is controlled to travel in the first traveling direction, and the first drive wheel is controlled to remain stationary.

The first traveling direction is a traveling direction of the cleaning robot before the cleaning robot enters the obstacle obstruction state.

In some embodiments, controlling the first drive wheel to remain stationary refers to that a drive direction of the first drive wheel is controlled to be the first traveling direction and a rotation speed of the first drive wheel to be zero.

In some embodiments, the rotation speed of the drive wheel can be controlled to be zero by controlling the duty ratio to be zero. When the drive direction of the first drive wheel is the first traveling direction and the rotation speed is zero, a reverse rotation resistance of the first drive wheel increases, which can play a certain degree of braking effect, and help the second drive wheel to cross the obstacle.

In some embodiments, after the rotation speed of the first drivee wheel is controlled to be zero, since the second drive wheel travels in the first traveling direction, the force caused thereby may drive the first drive wheel to rotate to the second traveling direction. It is detected whether the first drive wheel rotates to the second traveling direction, and when the first drive wheel rotates to the second traveling direction, the first drive wheel is controlled to output a rotation force along the first traveling direction to remain stationary. The second traveling direction is opposite to the first traveling direction.

It should be noted that, ordinal numbers such as "first", "second" and "third" mentioned in embodiments of the present disclosure should be understood as merely for distinguishing unless they are meant to express order according to the context.

In addition, when it is detected that the cleaning robot is in the obstacle obstruction state, and there is an obstruction obstacle in a direction parallel to the traveling direction of the cleaning robot and perpendicular to a contact surface, after the first drive wheel is controlled to cross the obstacle, the second drive wheel is controlled to cross the obstacle. The first drive wheel is a drive wheel close to the obstruction obstacle, and the second drive wheel is a drive wheel away from the obstruction obstacle.

In some embodiments, the obstruction obstacle is not an obstacle that obstructs the cleaning robot to enter the obstacle obstruction state, and obstruction obstacle is the obstacle that the cleaning robot cannot move its position by hitting.

For example, the obstruction obstacle is a wall, that is, the cleaning robot is obstructed by the obstacle when traveling along the wall, in order to prevent the cleaning robot from hitting the wall due to the rotation generated during a single wheel crossing, the drive wheel close to the wall is controlled to first cross the obstacle, and then the drive wheel away from the wall is controlled to cross the obstacle.

As described above, with the method for crossing an obstacle according to embodiments of the present disclosure, when the cleaning robot travels, it is detected whether the cleaning robot is in an obstacle obstruction state, when the cleaning robot is in the obstacle obstruction state, in combination with other data of sensors, a decision of whether to control the cleaning robot to cross the obstacle is made. When it is decided to cross the obstacle, the first drive wheel is controlled to cross the obstacle, and the second drive wheel is controlled to cross the obstacle, problems that the cleaning robot cannot continue a cleaning task due to obstruction of obstacles during traveling are avoided, thereby allowing the cleaning robot to independently cross the obstacle, and improving workability of the cleaning robot.

In addition, with the method for crossing an obstacle according to embodiments of the present disclosure, the inclined angle of the cleaning robot is detected when the cleaning robot is in the obstacle obstruction state, when the inclined angle of the cleaning robot is less than the first angle, the cleaning robot is controlled to cross the obstacle, and when the inclined angle of the cleaning robot is greater than the first angle, the cleaning robot is controlled to travel in the second traveling direction, thereby avoiding the cleaning robot from continuously crossing the obstacle when the cleaning robot cannot cross the obstacle, which helps the cleaning robot to work flexibly, and improves work efficiency.

Figure 7:
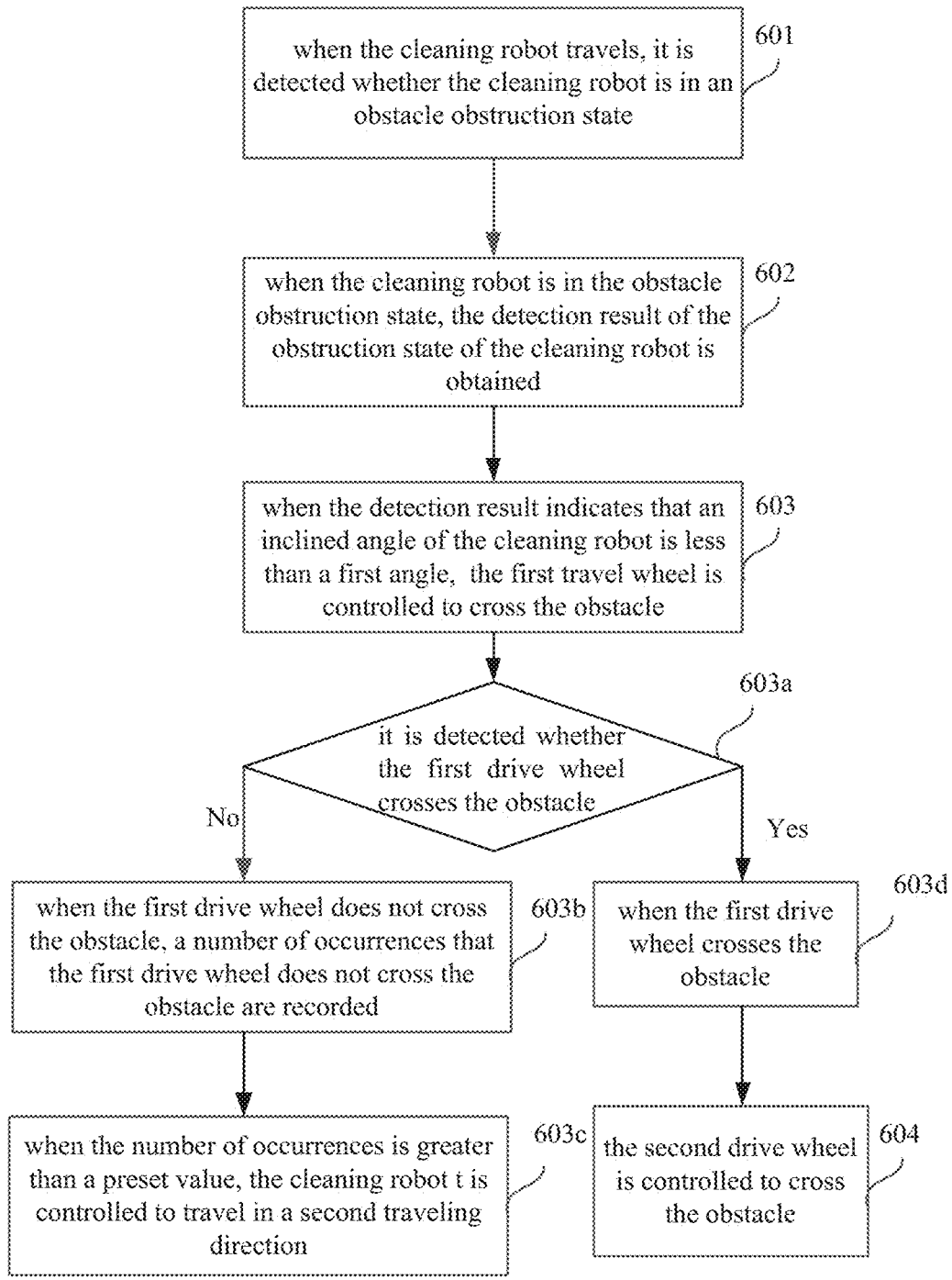
FIG. 7 is a flow chart of a method for crossing an obstacle according to another exemplary embodiment of the present disclosure.

In an alternative embodiment based on the embodiment shown in FIG. 6A, after the first drive wheel is controlled to cross the obstacle, it is determined whether to control the second drive wheel to cross the obstacle by detecting whether the first drive wheel crosses the obstacle. The method for crossing an obstacle may also include block 603*a*, 603*b* and 603*c*, as shown in FIG. 7.

At block 603a, it is detected whether the first drive wheel crosses the obstacle.

In some embodiments, assuming that the third time point is a time point when the cleaning robot enters the obstacle obstruction state and has not started to cross the obstacle, and assuming that the fourth time point is a time point after the first drive wheel of the cleaning robot crosses the obstacle.

At the fourth time point, an inclined angle of the cleaning robot is acquired through a triaxial accelerometer, when it is detected that the inclined angle of the cleaning robot at the fourth time point is less than the first angle, it is determined that the first drive wheel crosses the obstacle, otherwise it is determined that the first drive wheel does not cross the obstacle.

Alternatively, at the fourth time point, an inclined angle of the cleaning robot is acquired through a gyroscope, when it is detected that the inclined angle of the cleaning robot at the fourth time point is less than the first angle, it is determined that the first drive wheel crosses the obstacle, otherwise it is determined that the first drive wheel does not cross the obstacle.

Alternatively, at the third time point and the fourth time point, distances of the cleaning robot to the front obstacle are acquired through a LDS, when it is detected that the distance to the front obstacle corresponding to the fourth time point is less than that of corresponding to the third time point, it is determined that the first drive wheel crosses the obstacle, otherwise it is determined that the first drive wheel does not cross the obstacle. Alternatively, a drive current of the motor connected to the first drive wheel is acquired, when the drive current is the drive current when the cleaning robot travels normally, it is determined that the first drive wheel crosses the obstacle, otherwise it is determined that the first drive wheel does not cross the obstacle.

Alternatively, at the third time point and the fourth time point, distances of the cleaning robot to the contact surface are acquired, when it is detected that the distance of the cleaning robot to the contact surface corresponding to the fourth time point is less than that of corresponding to the third time point, it is determined that the first drive wheel crosses the obstacle, otherwise it is determined that the first drive wheel does not cross the obstacle.

At block 603b, when the first drive wheel does not cross the obstacle, a number of occurrences that the first drive wheel does not cross the obstacle are recorded.

At block 603c, when the number of occurrences is greater than a preset value, the cleaning robot t is controlled to travel in a second traveling direction.

The second traveling direction is opposite to the first traveling direction, and the first traveling direction is a traveling direction of the cleaning robot before the cleaning robot enters the obstacle obstruction state.

In some embodiments, the preset value may be set by manufacturers before the cleaning robot is shipped from the factory, or the preset value may be set by the user.

At block 603d, when the first drive wheel crosses the obstacle, block 604 is performed.

In addition, after the first drive wheel crosses the obstacle, the second drive wheel crosses the obstacle, it can also detect whether the second drive wheel crosses obstacle. When the second drive wheel does not cross the obstacle, a number of occurrences that the second drive wheel does not across the obstacle is recorded. When the number of occurrences that the second drive wheel does not across is greater than a preset value, the cleaning robot is controlled to travel in the second traveling direction.

With the method for crossing an obstacle according to embodiments of the present disclosure, it is detected whether the first drive wheel crosses the obstacle, the number of occurrences of not crossing the obstacle is recorded when the obstacle is not crossed, when the number of occurrences is greater than a preset value, it is indicated that the cleaning robot cannot cross the obstacle, and the cleaning robot is controlled to travel in the second traveling direction, thereby avoiding the cleaning robot from continuously crossing the obstacle when the cleaning robot cannot cross the obstacle, which helps the cleaning robot to work flexibly, and improves work efficiency.

At least some embodiments of the present disclosure can have one or more of the following advantages. For example, when the cleaning robot operates, it is detected whether the cleaning robot is in an obstacle obstruction state. If the cleaning robot is in the obstacle obstruction state, in combination with other data of sensors, a decision of whether to control the cleaning robot to cross the obstacle is made. If it is decided to cross the obstacle, the first drive wheel is controlled to cross the obstacle, and the second drive wheel is controlled to cross the obstacle, problems that the cleaning robot cannot continue a cleaning task due to obstruction of obstacles during traveling are avoided, thereby allowing the cleaning robot to independently cross the obstacle, and improving flexibility of the cleaning robot.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

The features disclosed herein may be implemented as part of a smart home or a smart office design, which may implement individually or integrally various electronic devices in a home or office. For example, control or display functions described above may be realized on a mobile terminal such as a smart phone, or on a smart television Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A cleaning robot, comprising:
   a driver comprising a first drive wheel and a second drive wheel arranged in parallel;
   a detector configured to detect an obstacle;
   a determining circuit configured to determine whether the cleaning robot is in an obstacle obstruction state; and
   a controller configured to control the first drive wheel to cross an obstacle according to a detection result when the cleaning robot is in the obstacle obstruction state,
   wherein the detector is further configured to detect whether the first drive wheel crosses the obstacle; and
   the controller is further configured to control the second drive wheel to cross the obstacle when the detector detects that the first drive wheel crosses the obstacle.

2. The cleaning robot according to claim 1, wherein the controller is further configured to:
   control the first drive wheel to cross the obstacle when the cleaning robot is in the obstacle obstruction state and an inclined angle of the cleaning robot is less than a first angle.

3. The cleaning robot according to claim 2, wherein when the controller controls the first drive wheel to cross the obstacle, the controller is further configured to:
   control the first drive wheel to travel in a first traveling direction, and control the second drive wheel to travel in a second traveling direction; or
   control the first drive wheel to travel in the first traveling direction at a first speed, and control the second drive wheel to travel in the first traveling direction at a second speed, the first speed being greater than the second speed; or
   control the first drive wheel to travel in the first traveling direction, and control the second drive wheel to remain stationary;
   wherein the first traveling direction is a traveling direction of the cleaning robot before the cleaning robot enters the obstacle obstruction state, and the second traveling direction is opposite to the first traveling direction.

4. The cleaning robot according to claim 3, wherein when the controller controls the second drive wheel to remain stationary, the controller is configured to:
   control a drive direction of the second drive wheel to be the first traveling direction and a rotation speed of the second drive wheel to be zero.

5. The cleaning robot according to claim 4, wherein:
   the detector is configured to detect whether the second drive wheel rotates to the second traveling direction after the controller controls the rotation speed of the second drive wheel to be zero; and
   the controller is configured to control the second drive wheel to output a rotation force along the first traveling direction to remain stationary when the second drive wheel rotates to the second traveling direction.

6. The cleaning robot according to claim 2, wherein:
   when the cleaning robot is in the obstacle obstruction state and an inclined angle of the cleaning robot is less than a second angle, the controller is configured to control the cleaning robot to travel in a second traveling direction; and
   the second traveling direction is opposite to a first traveling direction, the first traveling direction is the traveling direction of the cleaning robot before the cleaning robot enters the obstacle obstruction state, and the second angle is less than the first angle.

7. The cleaning robot according to claim 1, wherein when the controller controls the second drive wheel to cross the obstacle, the controller is configured to:
   control the second drive wheel to travel in a first traveling direction, and control the first drive wheel to travel in a second traveling direction; or
   control the second drive wheel to travel in the first traveling direction at a first speed, and control the first drive wheel to travel in the first traveling direction at a second speed, the first speed being greater than the second speed; or control the second drive wheel to travel in the first traveling direction, and control the first drive wheel to remain stationary;

wherein the first traveling direction is a traveling direction of the cleaning robot before the cleaning robot enters the obstacle obstruction state, and the second traveling direction is opposite to the first traveling direction.

8. The cleaning robot according to claim 7, wherein when the controller controls the first drive wheel to remain stationary, the controller is configured to:
control a drive direction of the first drive wheel to be the first traveling direction and a rotation speed of the first drive wheel to be zero.

9. The cleaning robot according to claim 8, wherein:
after the controller controls the rotation speed of the first drive wheel to be zero, the detector is configured to detect whether the first drive wheel rotates to the second traveling direction; and
when the first drive wheel rotates to the second traveling direction, the controller is configured to control the first drive wheel to output a rotation force along the first traveling direction to remain stationary.

10. The cleaning robot according to claim 1, wherein:
when an inclined angle of the cleaning robot is greater than a first angle, the controller is configured to control the cleaning robot to travel in a second traveling direction; and
the second traveling direction is opposite to a first traveling direction, and the first traveling direction is the traveling direction of the cleaning robot before the cleaning robot enters the obstacle obstruction state.

11. The cleaning robot according to claim 1, wherein:
when the detector detects that the first drive wheel does not cross the obstacle, a number of occurrences of not crossing the obstacle is recorded;
when the number of occurrences is greater than a preset value, the controller is configured to control the cleaning robot to travel in a second traveling direction; and
a first traveling direction is a traveling direction of the cleaning robot before the cleaning robot enters the obstacle obstruction state, and the second traveling direction is opposite to the first traveling direction.

12. The cleaning robot according to claim 1, wherein, in a situation that the cleaning robot is in the obstacle obstruction state, when the controller controls the first drive wheel to cross the obstacle and controls the second drive wheel to cross the obstacle, the controller is configured to:
control the first drive wheel to cross the obstacle, and control the second drive wheel to cross the obstacle when the cleaning robot is in the obstacle obstruction state and there is an obstruction obstacle in a direction parallel to a traveling direction of the cleaning robot and perpendicular to a contact surface, the contact surface being a plane where the cleaning robot performs a cleaning task;
wherein the first drive wheel is a drive wheel proximal to the obstruction obstacle, and the second drive wheel is a drive wheel distal from the obstruction obstacle.

13. The cleaning robot according to claim 1, wherein:
the detector is further configured to detect whether at least one of the first drive wheel or the second drive wheel is in a slipping state, the slipping state being a state in which at least one of the first drive wheel or the second drive wheel rotates on a contact surface in a sliding manner; and
the determining circuit is configured to determine that the cleaning robot is in the obstacle obstruction state when the at least one of the first drive wheel and the second drive wheel is in the slipping state.

14. The cleaning robot according to claim 1, wherein:
the detector is further configured to detect whether at least one of the first drive wheel and the second drive wheel is in a stuck state, the stuck state being a state in which at least one of the first drive wheel and the second drive wheel is stopped by an external force during rotation; and
the determining circuit is configured to determine that the cleaning robot is in the obstacle obstruction state when the at least one of the first drive wheel and the second drive wheel is in the stuck state.

15. The cleaning robot according to claim 1, wherein the determining circuit is further configured to:
acquire a traveling mileage of at least one of the first drive wheel or the second drive wheel, and a position of the cleaning robot; and
determine that the cleaning robot is in the obstacle obstruction state when a variation value of the traveling mileage is beyond a preset range and the position of the cleaning robot does not change.

16. The cleaning robot according to claim 1, wherein the determining circuit is further configured to:
detect whether a drive current of the driver is greater than a preset current value; and
determine that the cleaning robot is in the obstacle obstruction state when the drive current is greater than the preset current value.

17. The cleaning robot according to claim 1, wherein:
the detector is further configured to detect whether the cleaning robot is inclined; and
the determining circuit is further configured to determine that the cleaning robot is in the obstacle obstruction state when the cleaning robot is inclined.

18. A method for crossing an obstacle, applicable to a cleaning robot comprising a first drive wheel and a second drive wheel arranged in parallel and a controller, the method comprising:
detecting the obstacle;
determining whether the cleaning robot is in an obstacle obstruction state; and
controlling the first drive wheel to cross an obstacle, and controlling the second drive wheel to cross the obstacle according to a detection result when the cleaning robot is in the obstacle obstruction state;
wherein said controlling the first drive wheel to cross an obstacle, and controlling the second drive wheel to cross the obstacle comprises:
controlling the first drive wheel to cross the obstacle
detecting whether the first drive wheel crosses the obstacle; and
controlling the second drive wheel to cross the obstacle when it is detected that the first drive wheel crosses the obstacle.

19. The method according to claim 18, further comprising:
recording a number of occurrences of not crossing the obstacle when first drive wheel does not cross the obstacle; and
controlling the cleaning robot to travel in a second traveling direction when the number of occurrences is greater than a preset value;
wherein
a first traveling direction is a traveling direction of the cleaning robot before the cleaning robot enters the obstacle obstruction state, and the second traveling direction is opposite to the first traveling direction.

20. A non-transitory computer readable storage medium, configured to store instructions, wherein when the instructions are executed by a processor, a method for crossing an obstacle is performed, the method comprising:
    detecting an obstacle;
    determining whether the cleaning robot is in an obstacle obstruction state when the cleaning robot travels; and
    controlling the first drive wheel to cross an obstacle, according to a detection result when the cleaning robot is in the obstacle obstruction state;
    wherein controlling the first drive wheel to cross an obstacle, and controlling the second drive wheel to cross the obstacle comprises:
    controlling the first drive wheel to cross the obstacle
    detecting whether the first drive wheel crosses the obstacle; and
    controlling the second drive wheel to cross the obstacle when it is detected that the first drive wheel crosses the obstacle.

\* \* \* \* \*